(12) United States Patent
Fong et al.

(10) Patent No.: US 8,535,198 B2
(45) Date of Patent: Sep. 17, 2013

(54) ZERO BACKLASH PLANETARY GEAR TRAIN

(75) Inventors: Zhang-Hua Fong, Minxiong Township, Chiayi County (TW); Szu-Hung Chen, Sanxing Township, Yilan County (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 13/572,910

(22) Filed: Aug. 13, 2012

(65) Prior Publication Data

US 2013/0203553 A1    Aug. 8, 2013

(30) Foreign Application Priority Data

Feb. 7, 2012   (TW) .............................. 101103918 A

(51) Int. Cl.
*F16H 57/08*   (2006.01)
*F16H 55/18*   (2006.01)

(52) U.S. Cl.
USPC ............................................ 475/331; 74/409

(58) Field of Classification Search
USPC ........................................................ 475/331
See application file for complete search history.

(56) References Cited

U.S. PATENT DOCUMENTS

| 5,387,162 | A  | * | 2/1995  | Yang ............................. 475/333 |
| 2004/0089089 | A1 |   | 5/2004  | Stevens et al. |
| 2011/0245030 | A1 | * | 10/2011 | Wakida et al. ................. 475/331 |
| 2012/0021867 | A1 | * | 1/2012  | Rosmarin ..................... 475/331 |

FOREIGN PATENT DOCUMENTS

TW    201022563    6/2010

* cited by examiner

*Primary Examiner* — Edwin A Young
(74) *Attorney, Agent, or Firm* — Muncy, Geissler, Olds & Lowe, PLLC

(57) ABSTRACT

A zero backlash planetary gear train, comprising: a shell, a planetary gear set, and at least a sun gear set. Planetary gear set is disposed in said shell, and includes a planetary arm rack having output axis, such that planetary arm rack in said shell is provided with a plurality of double-layer planetary gears. The planetary gear set includes a first planetary gear and a second planetary gear. A buffer mechanism is provided between first planetary gear and second planetary gear. Said first planetary gear is engaged with at least an internal gear on an inner rim of shell, and second planetary gear is engaged with at least a sun gear set. Sun gear set is provided with a sun gear connected to a driving motor. Said zero backlash planetary gear train is capable of eliminating backlash between gears.

10 Claims, 6 Drawing Sheets

ZERO BACKLASH PLANETARY GEAR TRAIN

BACKGROUND OF THE INVENTION

1. Field of the Invention

The present invention relates to a speed reducing mechanism, and in particular to a zero backlash planetary gear train capable of eliminating backlash.

2. The Prior Arts

In general, the planetary gear train is used to reduce rotation speed and raise output torsion, and it can have various types and structures. Due to imperfections of manufacturing precision, so that during assembly, very large or small backlash may occur, and that is rather difficult to correct, thus severely affecting precision in forward and reverse rotations, and its overall performance.

In this respect, refer to Taiwan Patent No. 201022563A1, wherein, relative displacement between slant gear pairs are adjusted to reduce gear backlash between sun gear and planetary gear, and the planetary gear and the internal gear. As shown in FIG. 1, the housing 50 is provided with a straight tooth section 52, and a planetary gear set 54. The planetary gear set 54 is provided with a plurality of planetary gears 56, each of which is engaged respectively with the straight tooth section 52 and the sun gear slant tooth section 58 of input axis. In such a structure, through adjusting the relative positions of the sun gear slant tooth sections 58 and the planetary gear, the function of adjusting backlash can be achieved. However, due to different degrees of precision for the various gears, the backlashes between sun gear 60 and various planetary gears 56 can not be reduced to zero at the same time. Also, along with increase of usage, the wear of tooth faces tends to increase backlashes between gear pairs, and presently that can only be adjusted manually, and can not be achieved automatically.

Also, refer to U.S. Patent No. 20040089089. Wherein, as shown in FIG. 2, the gear train is composed of a first gear 62, a second gear 64, and a third gear 66. An elastic body 68 is disposed between the respective gears to make the gears to produce relative rotations, so as to eliminate automatically backlash between the upper and lower gear pair engaged to each other. The shortcomings of this structure are that, since the elastic body 68 is deformed under force, so that a slight time difference exists between outputs of torques. Also, the stiffness of the overall structure is insufficient for use in large horse power transmission mechanism. Moreover, in this kind of design, during assembly, additional fixtures are required.

From the descriptions mentioned above, it can be known that, presently, the backlash regulating and eliminating mechanism of the planetary gear is not able to provide the various advantages required for the gear pairs at the same time: automatic backlash elimination, zero time difference of torque transmission, high stiffness, easy assembly, and suitable to use in various planetary gear structures.

Therefore, presently, the design and performance of gear backlash eliminating mechanism is not quite satisfactory, and it has much room for improvements.

SUMMARY OF THE INVENTION

In view of the problems and drawbacks of the prior art, the present invention provides a zero backlash planetary gear train that is capable of eliminating backlash automatically, to overcome the shortcomings of the prior art.

A major objective of the present invention is to provide zero backlash planetary gear train, such that when gear backlash occurs, it is capable of eliminating the backlash automatically, so the planetary gear train may make forward and reverse rotations without backlash.

Another objective of the present invention is to provide a zero backlash planetary gear train, having the advantages of better stiffness, increased precision, reduced vibrations, and lower noise, etc.

A further objective of the present invention is to provide a zero backlash planetary gear train, such that during assembly, it can allow greater assembly tolerance for the gear pairs, in achieving higher assembly efficiency.

In order to achieve the above mentioned objective, the present invention provides a zero backlash planetary gear train, comprising: a shell, a planetary gear set, and at least a sun gear set. Wherein, the planetary gear set is disposed in the shell, and includes a planetary arm rack having output axis, and the planetary arm rack in the shell is provided with a plurality of double-layer planetary gears. The planetary gear set includes a first planetary gear and a second planetary gear. A buffer mechanism is provided between the first planetary gear and the second planetary gear, and the first planetary gear is engaged with at least an internal gear on the inner rim of the shell. At least a sun gear set is engaged with the second planetary gear, so that the sun gear set is provided with a sun gear connected to a driving motor.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
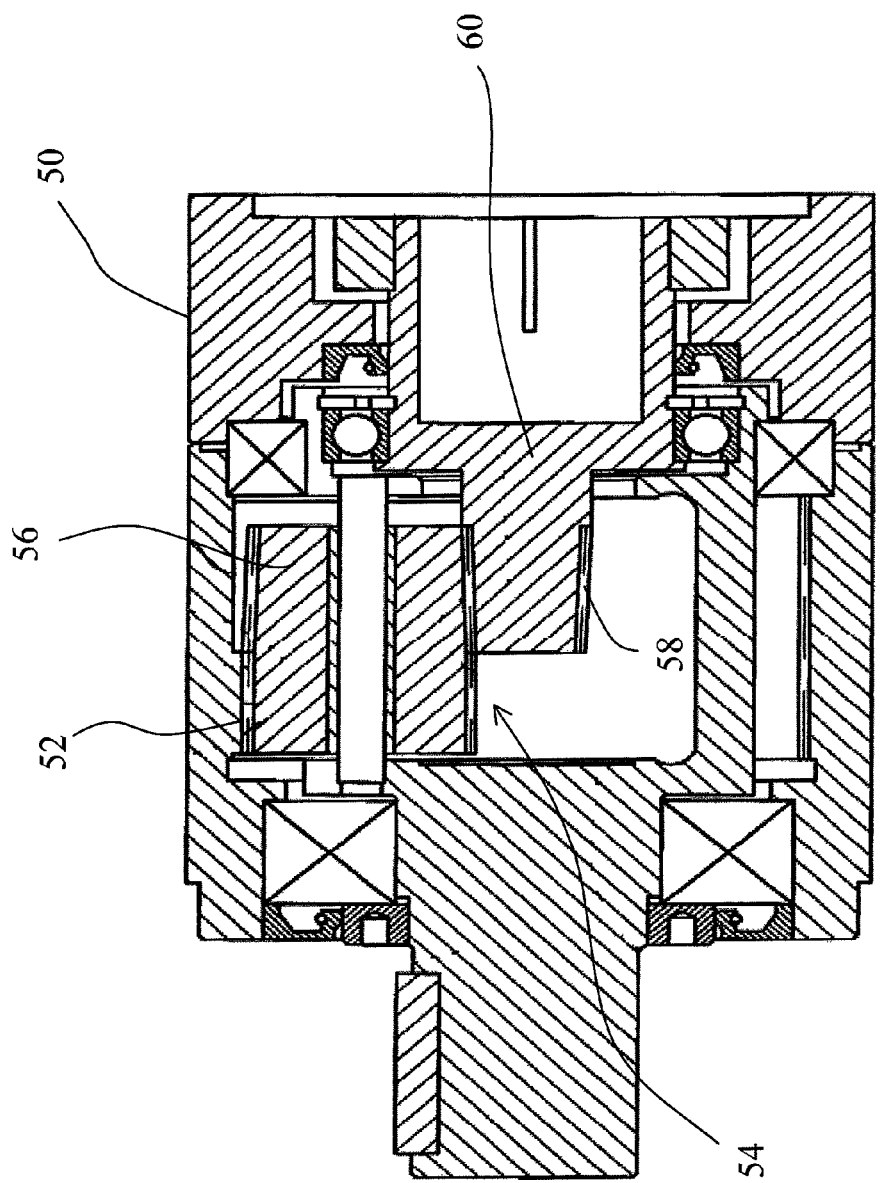
FIG. 1 is a schematic diagram of a planetary gear train according to the prior art.
Figure 2:
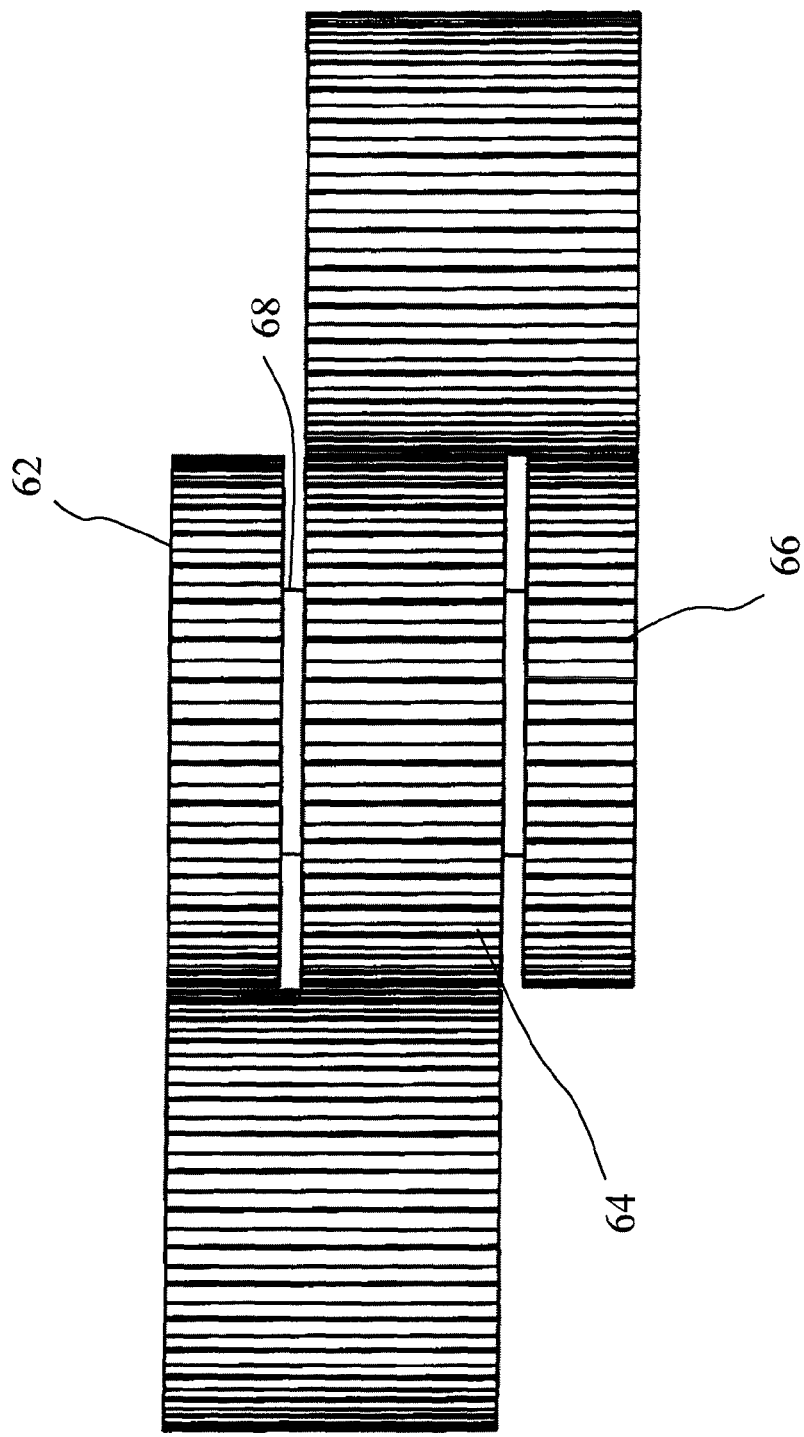
FIG. 2 is a schematic diagram of another planetary gear train according to the prior art.
Figure 3:
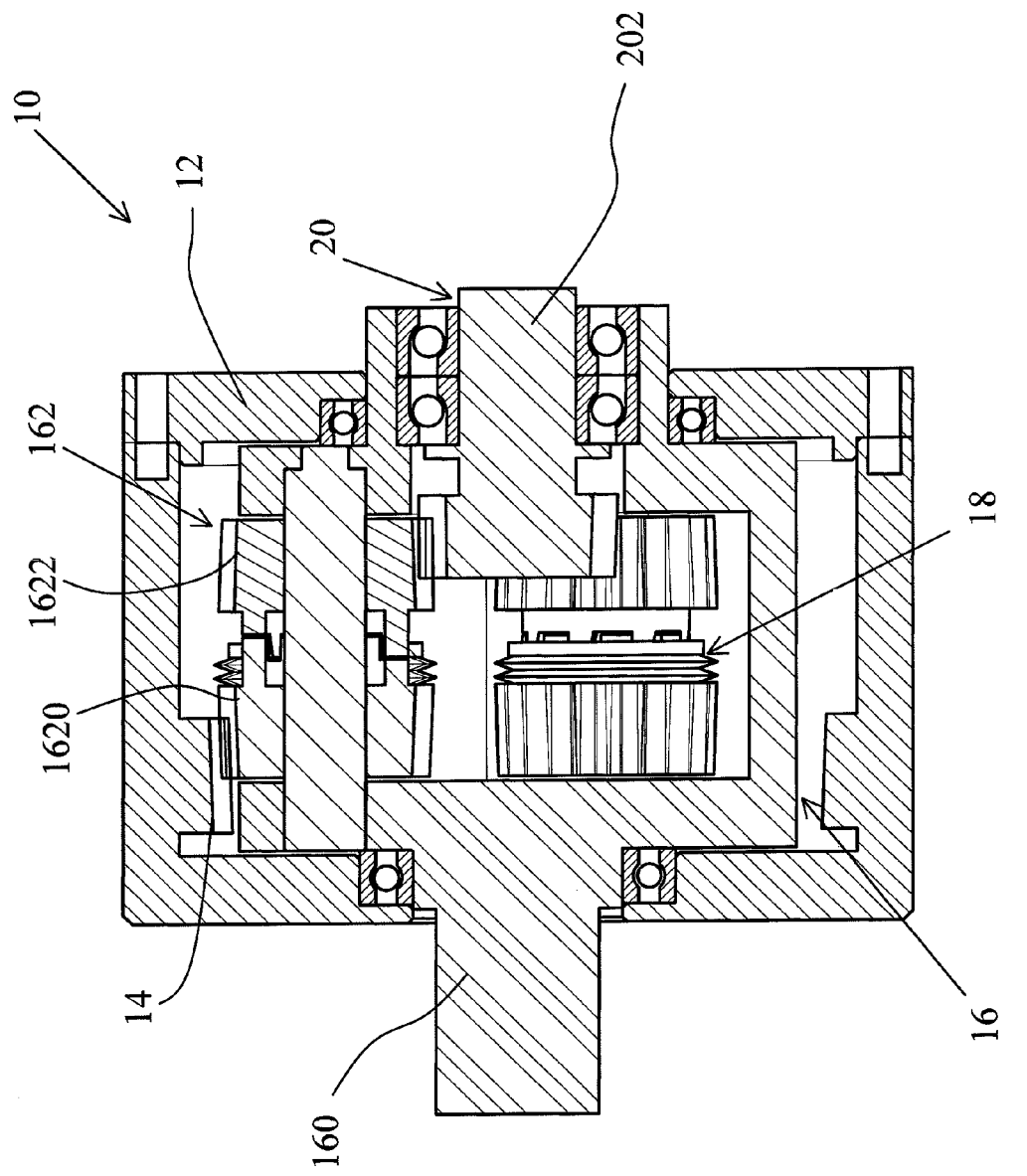
FIG. 3 is a cross section view of a zero backlash planetary gear train according to an embodiment of the present invention.

Refer to FIG. 3 for a cross section view of a zero backlash planetary gear train 10 according to an embodiment of the present invention. As shown in FIG. 3, the zero backlash planetary gear train 10 includes:

a shell 12, a planetary gear set 16, and at least a sun gear set. 20 Wherein, the inner rim of the shell 12 is provided with at least an internal gear 14. The planetary gear set 16 is disposed in the shell 12, and includes a planetary arm rack 160 having output axis, and the planetary arm rack 160 in the shell 12 is provided with a plurality of double-layer planetary gears 162. The planetary gear set 16 includes a first planetary gear 1620 and a second planetary gear 1622, and a buffer mechanism 18 is provided between the first planetary gear 1620 and the second planetary gear 1622, and is capable of eliminating backlash between gears, wherein, the first planetary gear 1620 is engaged with the internal gear 14, the second planetary gear 1622 is engaged with a sun gear set 20. The sun gear set 20 is provided with a sun gear 202 connected to a driving motor. In the descriptions above, the inner gear 14, the first planetary gear 1620, the second planetary gear 1622, and the sun gear 202 can be cone-shaped gears or drum-shaped gears.

Figure 4:
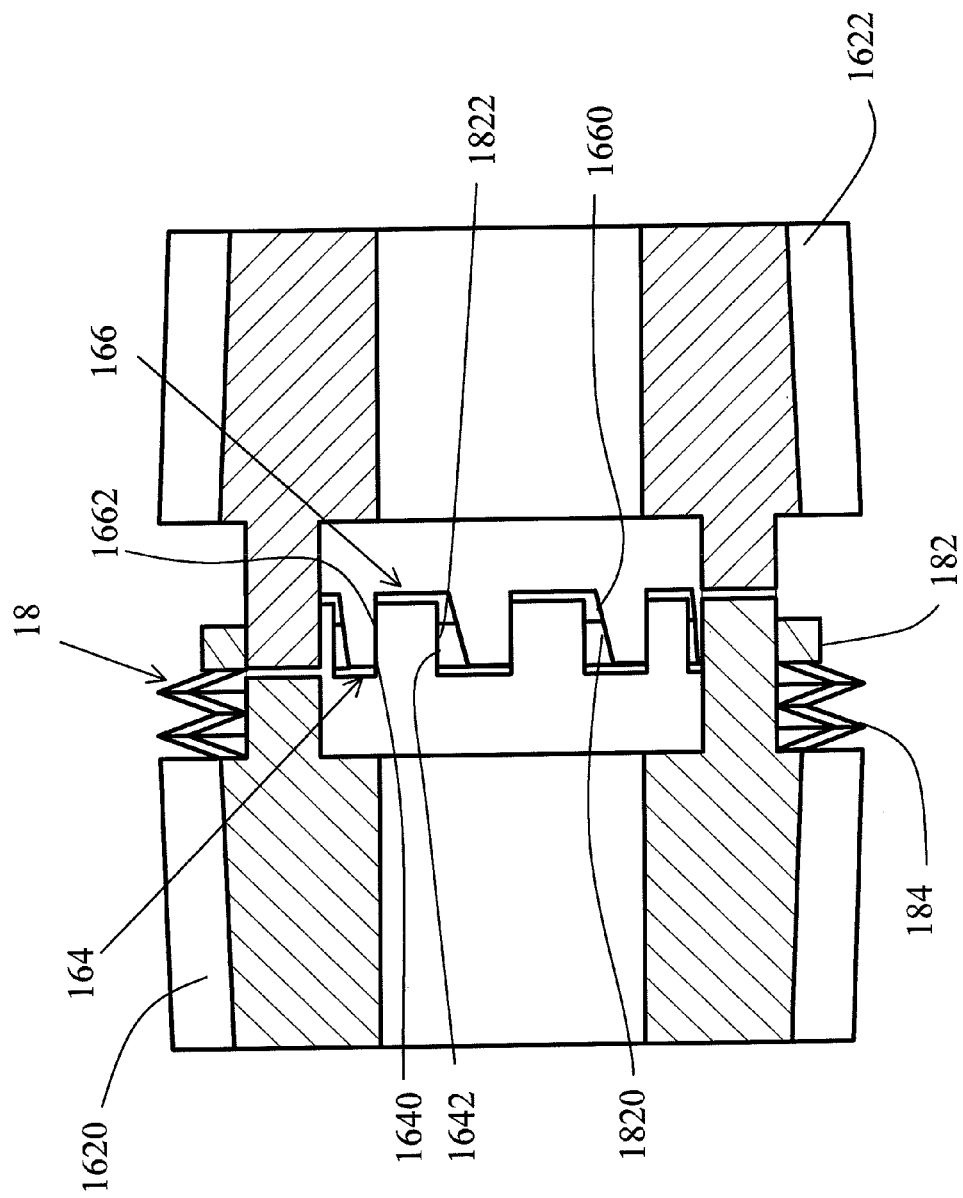
FIG. 4 is a cross section view of a buffer mechanism according to an embodiment of the present invention.

Next, refer to FIG. 4 for a cross section view of a buffer mechanism according to an embodiment of the present invention. As shown in FIG. 4, the buffer mechanism 18 includes a blocking block 182 and an elastic body 184. Wherein, the blocking block 182 is disposed between the first planetary gear 1620, the second planetary gear 1622. The first planetary gear 1620 is provided with a plurality of first slots 164, and the second planetary gear 1622 is provided with a plurality of second slots 166 engaged with the first slots 164. Wherein, the first slot 164 is provided with a first straight side 1640 and a second straight side 1642. The second slot 166 is provided with a first slant side 1660 and a third straight side 1662, so that the third straight side 1662 of the second slot 166 engaged with the first straight side 1640 of the first slots 164. The blocking block 182 is disposed between the first slot 164 and the second slot 166, and on which is provided with a second slant side 1820 engaged with the first slant side 1660, and a fourth straight side 1822 engaged with the second straight side 1642. The elastic body 184 is disposed between the blocking block 182 and the first planetary gear 1620.

Figure 5:
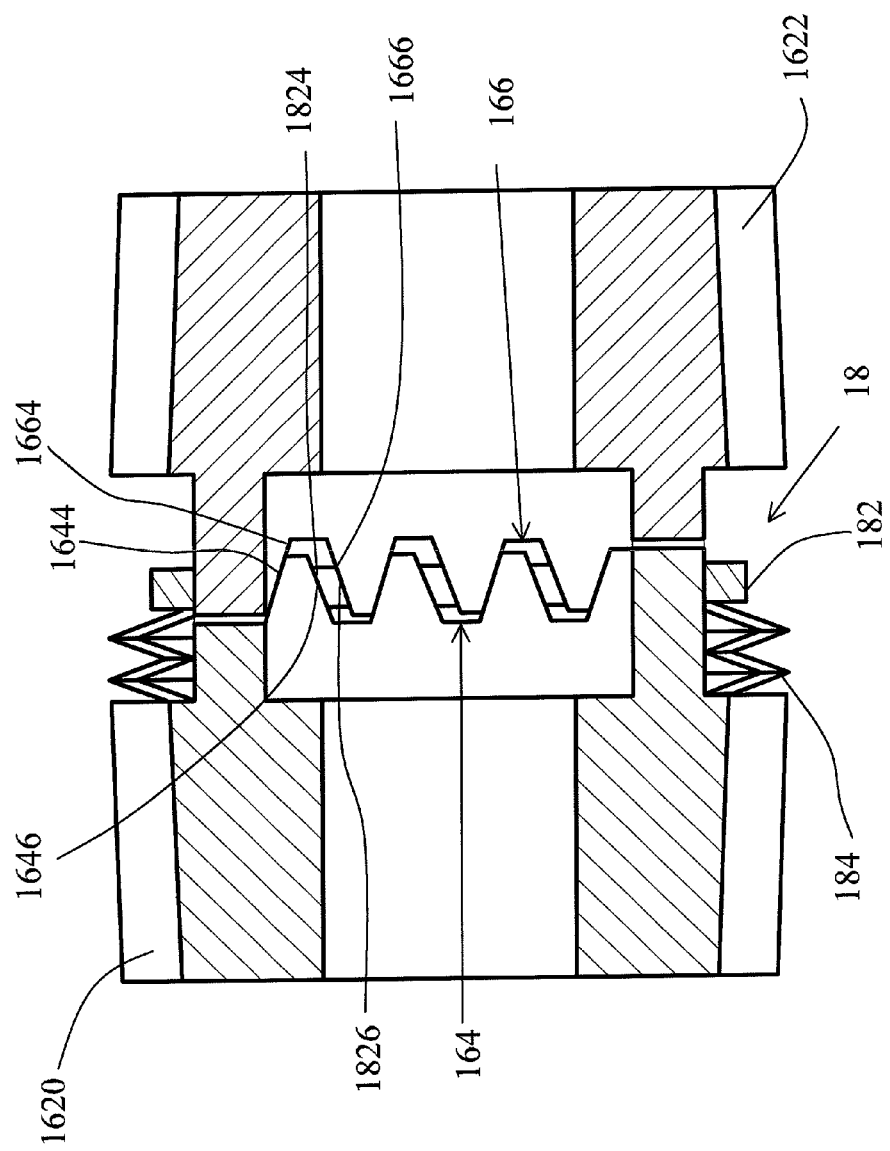
FIG. 5 is a cross section view of a buffer mechanism according to another embodiment of the present invention.

Then, refer to FIG. 5 for a cross section view of a buffer mechanism according to another embodiment of the present invention. As shown in FIG. 5, for the first slot 164 of the first planetary gear 1620, and the second slot 166 of the second planetary gear 1622, the first slot 164 is further provided with a third slant side 1644 and a fourth slant side 1646, and the second slot 166 is provided with a fifth slant side 1664 and a sixth slant side 1666. Wherein, the third slant side 1644 is engaged with the fifth slant side 1666. The blocking block 182 is provided with a seventh slant side 1824 engaged with the fourth slant side 1646, and an eighth slant side 1826 engaged with the sixth slant side 1666. The elastic body 184 is disposed between the blocking block 182 and the first planetary gear 1620.

In operations, when wear between gears occurs, the elastic force of the elastic body 184 will act upon the blocking block 182 and the first planetary gear 1620, and the blocking block 182 will act on the second planetary gear 1622, so that the second planetary gear 1622 and the sun gear set 20 can achieve zero backlash. The elastic force of the elastic body 184 will make the first slot 164 to move outward along the engaging face of the second slot 166, and the engaging face of the blocking block 182, so as to make the first planetary gear to move outward, so that the first planetary gear 1620 and the internal gear 14 can achieve zero backlash. Through the action of the buffer mechanism 18, the first planetary gear 1620 and the second planetary gear 1622 are made to produce relative displacement, so that the first planetary gear 1620, the second planetary gear 1622, and the blocking block 182 are in close contact. The buffer mechanism 18 is capable of elimi-nating automatically the backlashes between all the gear pairs in the planetary gear mechanism. The direction of action of the elastic body 184 is different from the direction of torque transmission, and the elastic force is far less than the transmission torque, so that when the mechanism is in forward or reverse rotation, the first planetary gear 1620, the second planetary gear 1622, and the blocking block 182 are in close contact, such that the rotation angle has no transmission errors, and the transmission torque has no time delay, and the mechanism has better stiffness.

Figure 6:
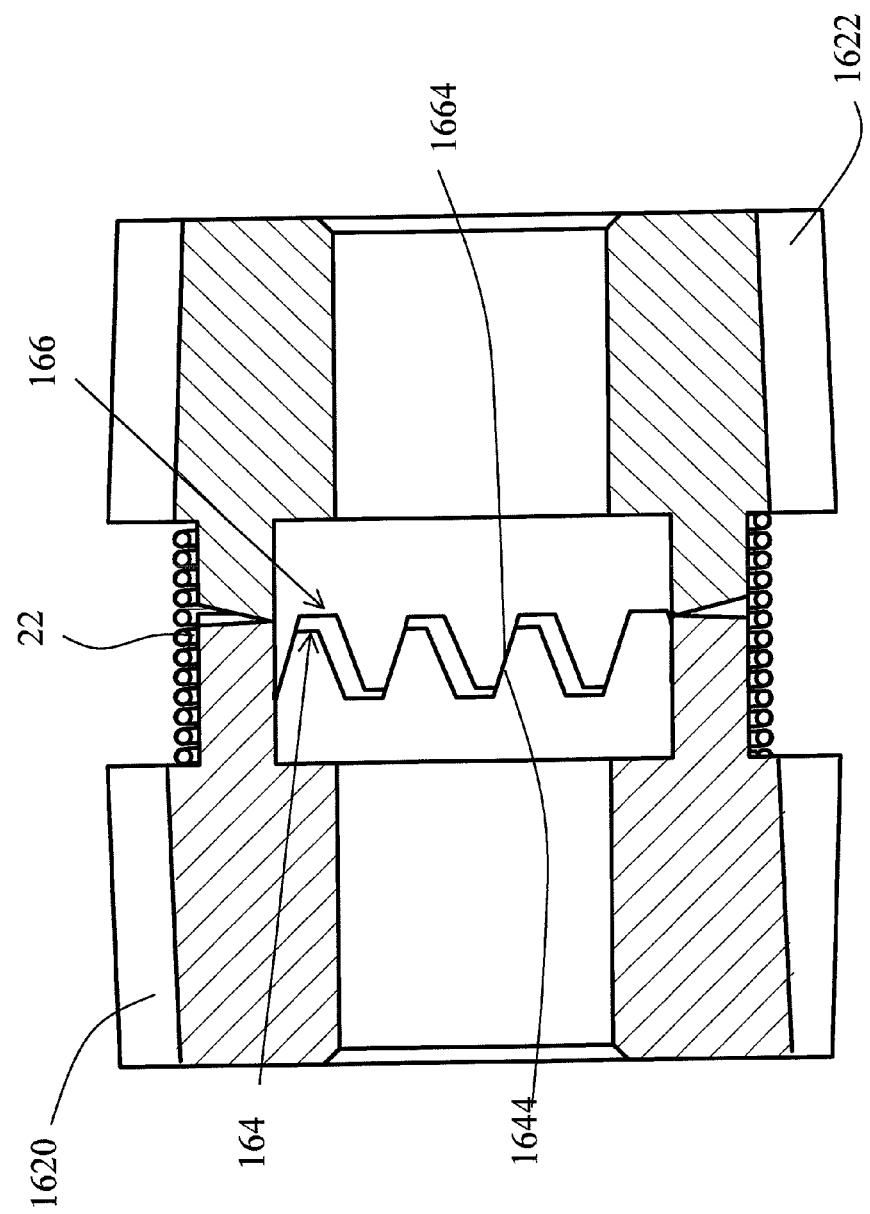
FIG. 6 is a cross section view of a torsion mechanism according to the present invention.

Finally, refer to FIG. 6 for a cross section view of a torsion mechanism according to the present invention. As shown in FIG. 6, both sides of the first slot 164 and the second slot 166 of the first planetary gear 1620 and the second planetary gear 1622 are provided respectively with a torsion mechanism 22. The torsion mechanism 22 is used to make the first planetary gear 1620 and the second planetary gear 1622 to produce relative displacement, so that the first slot 164 and the second slot 166 are engaged and in close contact. When the wear between the gears occurs, the torsion mechanism 22 will make the first planetary gear 1620 and the second planetary gear 1622 to produce relative rotation, so that the third slant side 1644 engaged with the fifth slant side 1664 to produce relative displacement, to eliminate backlash between respective engaging gear pairs, so that in forward and reverse rotations the zero backlash planetary gear train is able to maintain in a gear zero backlash state.

Summing up the above, when backlash between gears occurs, the two planetary gears are made to produce relative movements through a mechanism, to eliminate backlash between gears, so that in both forward and reverse rotations, the planetary gear train can achieve zero backlash. Also, in this process, in both the forward and reverse rotations, the torque is transmitted through rigid body transmission, thus having the advantages of: better stiffness, increased precision, reduced vibration, lower noise, and zero backlash. In assembly, the zero backlash planetary gear train can allow greater assembly tolerance for the gear pairs, in achieving higher assembly efficiency.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A zero backlash planetary gear train, comprising:
a shell, an inner rim of said shell is provided with at least an internal gear;
a planetary gear set, disposed in said shell, and includes a planetary arm rack having output axis, said planetary arm rack in said shell is provided with a plurality of double-layer planetary gears, said planetary gear set includes a first planetary gear and a second planetary gear, said first planetary gear is engaged with said internal gear, and a buffer mechanism is provided between said first planetary gear and said second planetary gear; and
at least a sun gear set, engaged with said second planetary gear, and said sun gear set is provided with a sun gear connected to a driving motor.

2. The zero backlash planetary gear train as claimed in claim 1, wherein
said first planetary gear is provided with a plurality of first slots, and said second planetary gear is provided with a plurality of second slots engaged with said plurality of first slots, wherein, said first slot is provided with a first straight side and a second straight side, and said second slot is provided with a first slant side and a third straight side, wherein, said third straight side is engaged with said first straight side.

3. The zero backlash planetary gear train as claimed in claim 2, wherein
said buffer mechanism includes: a blocking block, disposed between said first slot and said second slot, said blocking block is provided with a second slant side engaged with said first slant side, and a fourth straight side engaged with said second straight side; and an elastic body, disposed between said blocking block and said first planetary gear.

4. The zero backlash planetary gear train as claimed in claim 1, wherein
said first planetary gear is provided with a plurality of first slots, and said second planetary gear is provided with a plurality of second slots engaged with said plurality of first slots, wherein, said first slot is provided with a third slant side and a fourth slant side, and said second slot is provided with a fifth slant side and a sixth slant side, wherein, said third slant side is engaged with said fifth slant side.

5. The zero backlash planetary gear train as claimed in claim 4, wherein
said buffer mechanism includes: a blocking block, disposed between said first slot and said second slot, said blocking block is provided with a seventh slant side engaged with said fourth slant side, and an eighth slant side engaged with said sixth slant side; and an elastic body, disposed between said blocking block and said first planetary gear.

6. The zero backlash planetary gear train as claimed in claim 4, wherein
on both sides of said first slot and said second slot are each provided with a torsion mechanism, capable of making said first planetary gear and said second planetary gear to produce relative displacement, so that said first slot and said second slot engaged tightly.

7. The zero backlash planetary gear train as claimed in claim 1, wherein
said sun gear is a cone-shaped gear or a drum-shaped gear.

8. The zero backlash planetary gear train as claimed in claim 1, wherein
said internal gear is a cone-shaped gear or a drum-shaped gear.

9. The zero backlash planetary gear train as claimed in claim 1, wherein
said first planetary gear is a cone-shaped gear or a drum-shaped gear, and said second planetary gear is a cone-shaped gear or a drum-shaped gear.

10. The zero backlash planetary gear train as claimed in claim 1, wherein
said shell is a ring body.

* * * * *